United States Patent [19]
Dukek

[11] 3,929,641

[45] Dec. 30, 1975

[54] ELECTROSTATIC CHARGE REDUCTION IN FILTER-SEPARATORS

[75] Inventor: William G. Dukek, Summit, N.J.

[73] Assignee: Exxon Research & Engineering Co., Linden, N.J.

[22] Filed: Feb. 3, 1975

[21] Appl. No.: 546,424

Related U.S. Application Data

[63] Continuation of Ser. No. 427,513, Dec. 26, 1973, abandoned.

[52] U.S. Cl. ................ 210/73; 210/243; 210/316; 210/DIG. 5
[51] Int. Cl.² ........................................ B01D 29/42
[58] Field of Search ....... 210/65, 73, 243, 339, 316, 210/DIG. 5

[56] References Cited
UNITED STATES PATENTS

| | | | |
|---|---|---|---|
| 3,088,592 | 5/1963 | Clark | 210/316 X |
| 3,319,793 | 5/1967 | Miller et al. | 210/243 |
| 3,473,663 | 10/1969 | Winslow | 210/316 X |
| 3,519,560 | 7/1970 | Taylor | 210/316 |
| 3,567,619 | 3/1971 | Brown | 210/243 X |

*Primary Examiner*—John Adee
*Attorney, Agent, or Firm*—Harold N. Wells; F. Donald Paris

[57] ABSTRACT

A method and apparatus for reducing the static electrical charge developed in fuels during the filtering thereof by employing sufficient space after the separating element to permit substantial relaxation of the static charge buildup.

10 Claims, 6 Drawing Figures

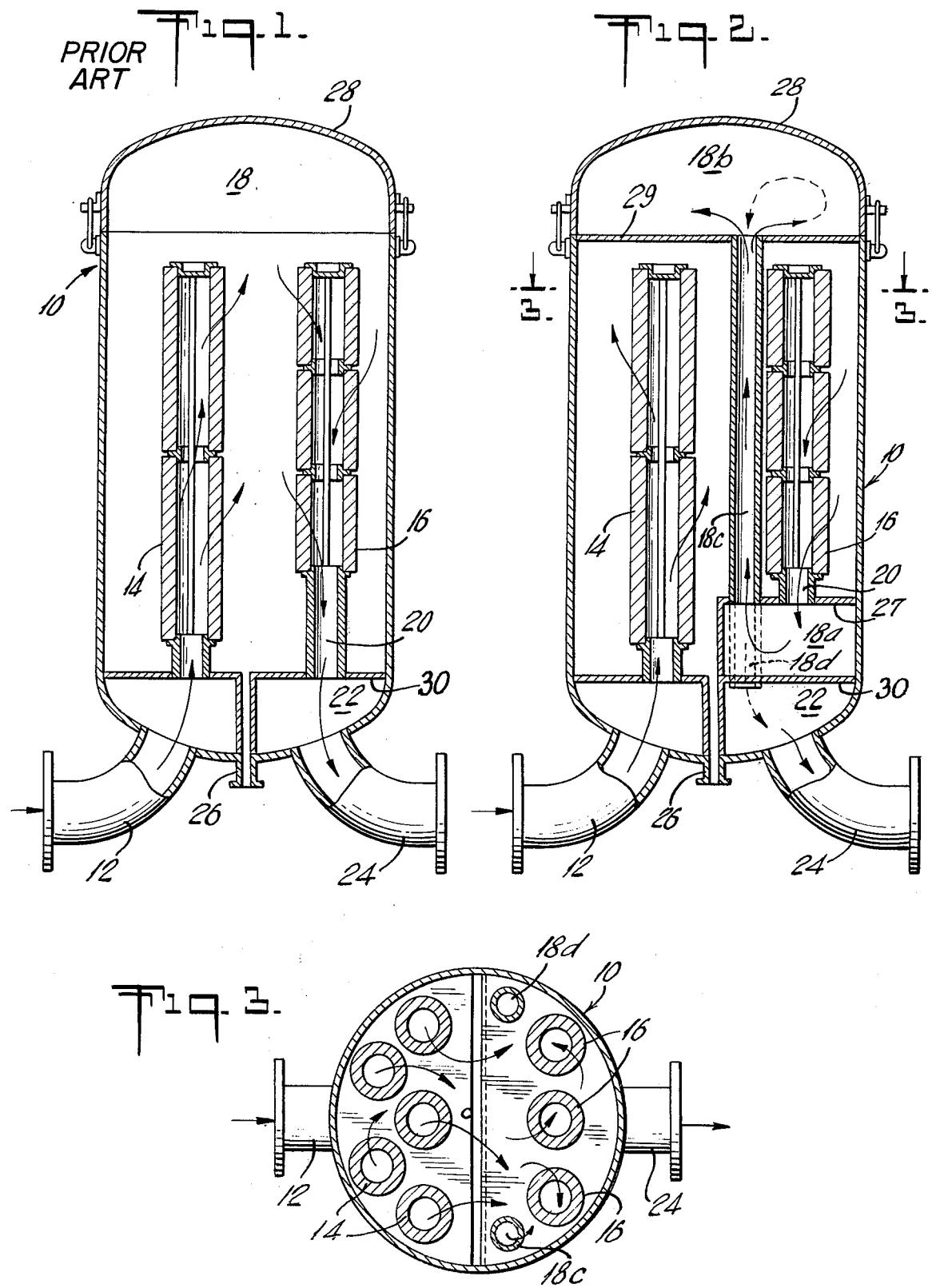

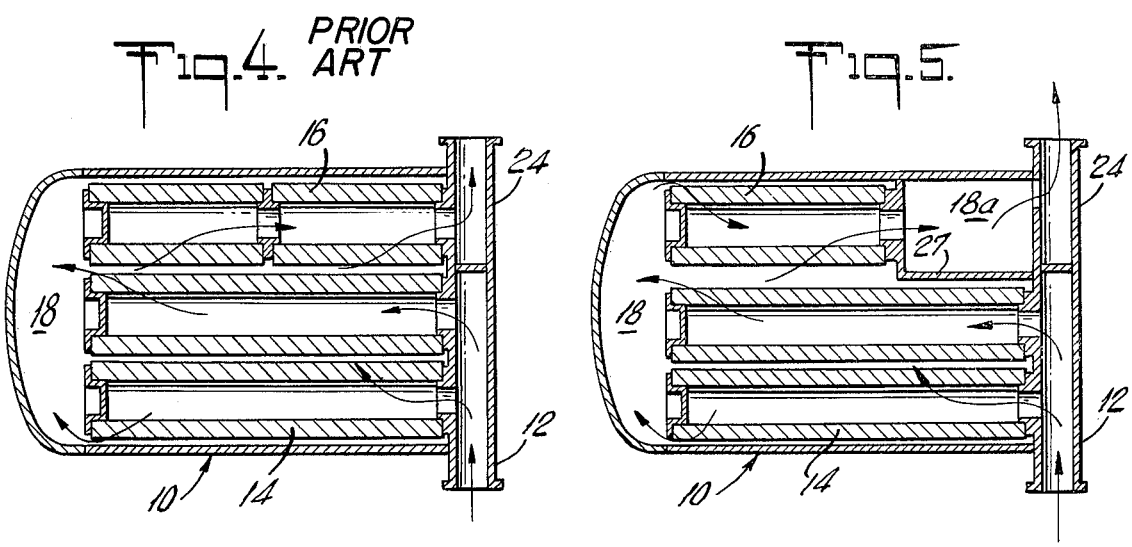
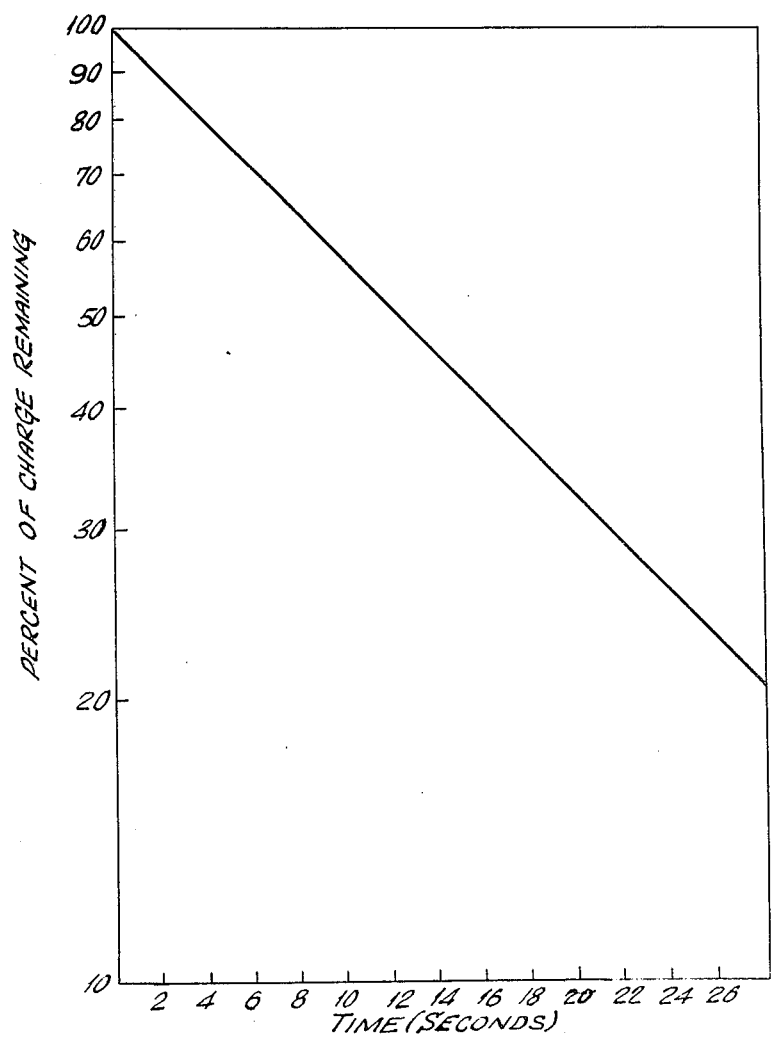

ELECTROSTATIC CHARGE REDUCTION IN FILTER-SEPARATORS

This is a continuation of application Ser. No. 427,513, filed Dec. 26, 1973, now abandoned.

BACKGROUND OF THE INVENTION

The present invention relates to the relaxation of static charges. In particular, it relates to filter-separators which relax the charged condition which is typical of fuels leaving ordinary filter-separators.

Explosions have taken place in connection with handling of gasoline and jet fuels. Although volatile hydrocarbons may form flammable mixtures with air, particularly during the filling or emptying of storage tanks, an explosion cannot occur without a source of ignition. Static electricity is often blamed for the ignition of such flammable mixtures. Static charges may be produced when a liquid moves past the surface of a solid or other liquid. Thus, liquids become charged with static electricity when they are pumped through pipes or filters, agitated in tanks, or sprayed into other liquids. It is believed that the mechanism which produces static electricity is the absorption of ions of one polarity on a surface with ions of opposite polarity remaining in the liquid and moving downstream. The flow of ions in the liquid stream constitutes an electric current known as a streaming current and this current produces a difference in electrostatic potential. This electrostatic potential may be discharged in such a way as to ignite any flammable mixture which may be present and resulting in a serious explosion and/or fire.

It is necessary to remove free water which may be contained in fuels, particularly jet fuels, because of the low temperature conditions at which aircraft operate. This is commonly done with commercially available filter-separators. They combine a pair of elements in series, the first serving to filter out solids and, being hydrophilic, to coalesce any free water droplets which may be contained in the fuel. The second filter element is hydrophobic, permitting the fuel to pass freely therethrough, but blocking the passage of the water droplets which have been coalesced in the filter element. These coalesced droplets then collect in the space between the filter and separator elements, both usually being combined in a single vessel, and thereafter the water is drained away from the bottom of the vessel.

Unfortunately, this process of filtering and removing free water from a fuel creates an electrostatic charge which may have serious consequences as discussed above. Accordingly, provisions must be made to accommodate the charged fuel downstream in order to avoid possible ignition of flammable mixtures. Available information indicates that the separator elements produce a significant electrostatic charge. The object of the present invention is to provide a filter-separator which has the ability to relax the charge, making it unnecessary to provide other means downstream of the filter separator unit for reducing the charge.

SUMMARY OF THE INVENTION

It has been found that by providing enough holdup time, it is possible to relax a substantial portion of any electrostatic charge buildup. The required holdup time is determined principally by the electrical conductivity of the specific fuel being handled, but in general the relationship between the amount of relaxation and the holdup time is exponential in nature, that is, only a brief period is required in order to relax a significant amount of the charge whereas a very long period is required to completely relax all of the charge. By including sufficient holdup time, it is possible to relax between 30 to 90% of the electrostatic charge.

In the preferred embodiment, it is possible to modify conventional commercial filter-separators in order to provide sufficient holdup by effectively utilizing space already available in them. Filter-separators designed according to the invention could provide for relaxation of most of the electrostatic charge by proper provision of holdup time, having knowledge of the fuels to be processed. The structure and details of the present invention are more fully disclosed in the description of the preferred embodiments which follow.

BRIEF DESCRIPTION OF THE DRAWINGS

FIG. 1 is a vertical filter-separator of the prior art.

FIG. 2 is a modified vertical filter-separator according to the present invention.

FIG. 3 is a sectional view taken substantially along line 3—3 of FIG. 2.

FIG. 4 is a horizontal vertical filter-separator according to the prior art.

FIG. 5 is a horizontal filter-separator modified according to the present invention.

FIG. 6 is a curve relating percentage relaxation of electrostatic charge to holdup time.

DESCRIPTION OF THE PREFERRED EMBODIMENTS

The present invention will be discussed herein principally in connection with modification of existing filter-separators. However, it should be clearly understood that the principles disclosed are applicable to newly designed filter-separators and accordingly are within the scope of the invention.

Although the invention is particularly applicable to jet fuels, it may be applied equally effectively to the filtering and separating of water from gasoline, aviation fuels, diesel fuels, burner oils and middle distillates.

FIG. 1 shows a typical vertical filter-separator 10. Fuel enters at the bottom inlet nozzle 12 which is connected to a conduit (not shown) which supplies the fuel from the usual storage facilities. Fuel passes upwardly into the inside of the filter-coalescer cartridge or cartridges 14. The cartridges 14 are hydrophilic, permitting passage of the fuel and water contained therein, but retaining any solid particles which should be filtered from the fuel. In passing through the filter-coalescer cartridge, the water droplets are coalesced, making them easier to settle and to separate by the second stage separator cartridges 16. Filtered fuel passes into the space 18 between the cartridges 14 and 16 and then enters the separator cartridges 16 from the outside. These cartridges 16, being hydrophobic, prevent coalesced water particles from entering. The fuel passes freely through the separator cartridges 16 and then through an internal passageway 20 to the outlet chamber 22 and then leaves the filter-separator 10 through the outlet nozzle 24. Water, which will not pass through the separator cartridges 16, falls to the bottom of the separator 10 owing to its relatively higher density, collects, and is drained away through the drain 26 from the bottom of the separator 10. Inasmuch as the filter-coalescer and separator cartridges must be periodically removed and replaced, an easily removable head 28 is installed on the body of the separator 10 which contains supporting member 30 upon which cartridges 14 and 16 are installed. It has been found that this space provides sufficient holdup time so that, if properly modified, the filter-separator can effectively relax the static charge buildup which occurs when the fuel passes through the coalescer and separator cartridges in series.

The conventional filter-separator modified according to the invention is shown in FIG. 2, substantially the same as that in FIG. 1, but with important modifications. Space 18 has been compartmented and two chambers, 18a and 18b, have been provided for fuel leaving the separator cartridges 16. The first, 18a, is made by placing a partition 27 under the separator cartridges 16 which are attached thereto. This partition 27 operatively replaces the separator partition 30 in the original design, which is retained but in this modification serves a different purpose. Fuel passing from the interior of the separator cartridges 16 through a shortened conduit 20 enters the first chamber 18a and from there passes in an upwardly direction through the riser pipe 18c into the second chamber 18b which provides the major portion of the required holdup. The second chamber 18b is formed by placing a partition 29 across the upper portion of the vessel. This partition member 29 must of course be easily removable in order to permit access to the filter-coalescer and separator cartridges 14 and 16. Fuel leaves the second compartment 18b via the downflow duct 18d which returns the liquid to the space 22 originally provided for the outcoming fuel. From there, the fuel passes out of the filter-separator unit via nozzle 24.

FIG. 3 illustrates in a sectional view the disposition of the cartridges and passageways previously described. The fuel leaving the separator cartridges is accumulated in the first compartment 18a and passes from there via the riser pipe 18c into the upper holdup chamber 18b, from which it leaves via the downflow duct 18d into the original chamber 22 and then to the outlet nozzle 24. By placing risers 18c and 18d on opposite sides of upper holdup chamber 18b, maximum time is afforded for charged fuel to relax.

Such modifications as here described have commercial significance since it has been found that sufficient holdup volume is already available in many existing filter-separators to provide the holdup time for relaxation which is needed. Thus, these units may be modified in order to take at least partial advantage of the method of the invention.

FIG. 4 shows a typical horizontal filter-separator of the prior art, the construction of which is substantially similar to that of the vertical filter-separator already described. The equivalent parts are numbered correspondingly to those of FIGS. 1, 2, and 3. The horizontal separator may be modified in the same way as that of the vertical separator or it may, as shown in FIG. 5, be modified so as to provide all of the holdup space between the separator cartridges and the outlet nozzle. Such construction could of course be used in the vertical separator if the mechanical design were suitable.

FIG. 6 shows a typical curve of the relation between percentage of charge relaxed and holdup time for average jet fuels. The average fuel has an effective conductivity of 1 picosiemen per meter. Other curves can be drawn for fuels having different conductivities. In general, the higher the conductivity, the quicker the charge is relaxed. Typically, commercially available filter-separators when operated at their rated flow capacity provide a very short holdup time between the outlet of the separator cartridges and the outlet nozzle, e.g., in the order of one second. Accordingly, it can be seen from the curve that only a very small fraction of the charge which is created (about 5%) can be relaxed within this very short period. However, it is also clear that with the provision of roughly 13 seconds—a residence time typical of a filter-separator modified according to the invention, it is possible to produce a significant relaxation of the electrostatic charge, a typical figure being 50%. A range of 8–20 seconds holdup would be effective with a typical fuel represented by the curve of FIG. 6. Since this relaxation of electrostatic charge occurs exponentially, it is possible to provide a relatively short holdup time in a filter-separator and still obtain a very substantial relaxation of charge.

It will be clear from the foregoing principles and the modification of typical commercially available filter-separators that by proper design a filter-separator could be produced which would essentially relax 80–90% of the charge on almost any fuel which might be used. A full 100% relaxation would be a practical impossibility inasmuch as the relation between percentage relaxation and time is an exponential one. If the electrical conductivity of the fuel to be processed is known, the curve of FIG. 6 will be established and it would be possible to quite accurately design a filter-separator. For more general use, it would be recommended that a minimum holdup time of about 15 seconds should satisfy the largest majority of typical fuels.

The foregoing discussion of the preferred embodiments is for illustration of the invention only and should not be considered to limit the scope of the invention which is defined by the claims which follow.

What is claimed is:

1. A method for reducing the static electrical charge developed in fuels during the filtering and separation of free water therefrom in a multi-stage filter-separator vessel having an outlet including the following steps: passing static charged fuel from the last stage of the filter-separator to at least a first holding chamber; holding said fuel in at least said first holding chamber for a sufficient holdup time to permit substantial relaxation of the static charged fuel whereby the static charge in said fuel is substantially reduced; and passing the relaxed fuel out of said vessel.

2. The method of claim 1 wherein the holdup time is within the range of 8 to 20 seconds when the fuel is flowing at the design rate.

3. The method of claim 1 wherein said fuel is selected from the group consisting of gasoline, aviation fuels, diesel fuels, burner oils and middle distillates.

4. The method of claim 1 wherein said fuel comprises a jet fuel and including the step of holding said fuel for a time within the range of about 8–20 seconds at design flow rate of said fuel through said vessel.

5. The method of claim 1 including the steps of passing said fuel into a first holding chamber from said filter-separator at a location spaced from said outlet of said vessel; thereafter passing said fuel to a second holding chamber located proximate to said outlet of said vessel; and thereafter passing said fuel out of said vessel through said outlet.

6. The method of claim 5 wherein said vessel includes an outlet chamber adjacent said outlet and including the step of passing said fuel from said second holding chamber to said outlet chamber; and thereafter passing said fuel through said outlet of said vessel.

7. An apparatus for filtering fuels and coalescing free water present therein, separating said coalesced water, and relaxing the electrostatic charge created in the fuel during said coalescing and separating, comprising in combination:
   a. a hollow substantially cylindrical body having an inlet, an outlet chamber and an outlet from said outlet chamber;
   b. hydrophilic filter means disposed within said body in communication with said inlet for filtering incoming fuel and coalescing free water contained therein as it passes therethrough into said body;
   c. hydrophobic water separating means disposed within said body communicating between the interior of said body and said outlet such that free water coalesced in (b) is collected and separated while fuel is passed through said water separating means;
   d. drain means communicating with the interior of said body for removing free water separated in (c) from said body;
   e. holdup chamber means within said body for receiving the fuel which passes from said water separating means and in communication with said outlet chamber, said holdup chamber means being constructed and arranged to permit substantial relaxation of the static electrical charge built up in said fuel while passing through said filter and separating elements of (b) and (c) prior to transfer of said fuel from said holdup chamber to said outlet chamber.

8. The apparatus of claim 7 wherein said holdup chamber means comprises a first chamber located at a predetermined distance from said outlet chamber, and a second holdup chamber located proximate said outlet chamber.

9. The apparatus of claim 8 including a first riser conduit in said vessel for conveying the fuel from said separator-coalescer means to said first holdup chamber, and a second conduit in said vessel for conveying said fuel from said first holdup chamber to said second holdup chamber, said first and second conduits being located on opposite sides of said body for providing maximum amount of time for relaxation of the static charged fuel.

10. A method for reducing the static electrical charge developed in fuels during the filtering and separation of free water therefrom in a multi-stage filter-separator vessel having an outlet including the following steps: passing static charged fuel from the last stage of the filter-separator to at least a first holding chamber; holding said fuel in at least said first holding chamber for a sufficient holdup time to permit substantial relaxation of the static charged fuel whereby the static charge in said fuel is substantially reduced; determining the holdup time as a function of the percentage charge relaxation desired and the electrical conductivity of said fuel; and passing the relaxed fuel out of said vessel.

* * * * *